United States Patent [19]

Szlucha

[11] Patent Number: 5,140,368
[45] Date of Patent: Aug. 18, 1992

[54] CHARACTER PRINTING AND RECOGNITION SYSTEM

[75] Inventor: Thomas F. Szlucha, Fairport, N.Y.

[73] Assignee: Xerox Corporation, Stamford, Conn.

[21] Appl. No.: 553,053

[22] Filed: Jul. 16, 1990

[51] Int. Cl.⁵ .......................................... G03G 21/00
[52] U.S. Cl. ................................... 355/202; 355/200; 382/7; 382/46
[58] Field of Search .................. 355/202, 45; 382/7, 382/12, 46; 358/296, 300, 301; 346/74.2, 74.3

[56] References Cited

U.S. PATENT DOCUMENTS

| | | | |
|---|---|---|---|
| 3,654,435 | 4/1972 | Vaccaro | 235/61.12 M |
| 3,987,411 | 10/1976 | Kruklitis et al. | 340/146.3 C |
| 4,046,471 | 9/1977 | Brauham et al. | 355/202 |
| 4,399,553 | 8/1983 | Toyama | 382/7 |
| 4,414,579 | 11/1983 | Dattilo et al. | 355/202 X |
| 4,464,786 | 8/1984 | Nishito et al. | 382/7 |
| 4,531,132 | 6/1985 | Wilkinson | 346/76 PH |
| 4,590,606 | 5/1986 | Rohrer | 382/7 |
| 4,689,824 | 8/1987 | Mitchell et al. | 382/46 |
| 4,729,107 | 3/1988 | Hasegawa et al. | 382/46 X |
| 4,803,517 | 2/1989 | Bruce, Jr. | 355/202 |
| 4,827,531 | 5/1989 | Milford | 382/7 X |
| 4,859,550 | 8/1989 | Gruber et al. | 382/7 X |
| 4,922,086 | 5/1990 | Milford | 382/7 X |
| 5,020,117 | 5/1991 | Ooi et al. | 382/46 |
| 5,026,974 | 6/1991 | Franklin et al. | 382/7 X |

FOREIGN PATENT DOCUMENTS 0146382 9/1982 Japan ..................................... 382/12

*Primary Examiner*—A. T. Grimley
*Assistant Examiner*—Matthew S. Smith
*Attorney, Agent, or Firm*—H. Fleischer; J. E. Beck; R. Zibelli

[57] ABSTRACT

A character printing and detection system in which a toner image is fixed to a sheet with each character of the toner image being inverted so that the normally leading edge of each character is the trailing edge. The toner image on the sheet is magnetized. The sheet of support material is re-inverted so that the leading edge of each character of the toner image fixed to the sheet of the support material is the trailing edge. The intensity of the magnetic field generated by each character of the toner image fixed to the sheet is detected to identify each character.

5 Claims, 4 Drawing Sheets

CHARACTER PRINTING AND RECOGNITION SYSTEM

This invention relates generally to a character printing and recognition system, and more particularly concerns a printing machine which inverts the characters so that the normally leading edge of each character is the trailing edge thereof.

In the process of electrophotographic printing, a photoconductive member is uniformly charged and exposed to a light image of an original document. Exposure of the photoconductive member records an electrostatic latent image corresponding to the informational areas contained within the orginal document. After the electrostatic latent image is recorded on the photoconductive surface, the latent image is developed by bringing a developer material into contact therewith. This forms a powder image on the photoconductive member which is subsequently transferred to a copy sheet and permanently affixed thereto in image configuration.

Electrophotographic printing has been particularly useful in the commercial banking industry by reproducing checks or financial documents with magnetic ink, i.e. by fusing magnetic toner particles thereon. Each financial document has characters or symbols imprinted thereon which are recognized as unique characters of a specified type font. The document, upon which the characters are printed, is advanced past a magnetizing station, where the magnetizable ink is subjected to a magnetic field which magnetizes the ink in accordance with the unique geometry of the imprinted characters. The magnetic characters each have their own unique magnetic field which may be read by a magnetic ink character recognition (MICR) reader and processed. The lead edge definition of the character is a critical parameter. MICR readers are particularly sensitive to this parameter. Unfortunately, printing machines using the electrophotographic process often produce ragged edges. In particular, the lead edge is often ragged when the images are oriented parallel to the machine direction. Although visually this defect is very subtle, magnetic readability is affected measurably. The following disclosures may be relevant to various aspects of the present invention:

U.S. Pat. No. 3,654,435
 Patentee: Vaccaro
 Issued: Apr. 4, 1972
U.S. Pat. No. 3,987,411
 Patentee: Kruklitis et al.
 Issued: Oct. 19, 1976
U.S. Pat. No. 4,399,553
 Patentee: Toyama
 Issued: Aug. 16, 1983
U.S. Pat. No. 4,464,786
 Patentee: Nishito et al.
 Issued: Aug. 7, 1984
U.S. Pat. No. 4,531,132
 Patentee: Wilkinson
 Issued: Jul. 23, 1985

The relevant portions of the foregoing patents may be briefly summarized as follows:

U.S. Pat. No. 3,654,435 discloses a bar code in which the slanting or inclining of the leading edge of short bars is increased with respect to the direction of movement while maintaining the leading edge of the long bars perpendicular to the direction of movement. The trailing edge of the bars remains unchanged.

U.S. Pat. No. 3,987,411 describes a method of improving character recognition systems employed to distinguish MICR characters. The system compares and analyzes the voltage waveform of the character being read with an ideal waveform of a standard character font.

U.S. Pat. No. 4,399,553 discloses a character reader for reading magnetized ink. A magnetizing device is provided which magnetizes the magnetic ink particles on the pad roller so as to have an opposite polarity to that of the magnetized characters to prevent erroneous detection. In turn, a character reader is provided with high character recognition reliability.

U.S. Pat. No. 4,464,786 describes a detection circuit for detecting leading and trailing edges of a printed section of a currency note.

U.S. Pat. No. 4,531,132 discloses a method for thermally printing various stylized fonts of MICR data on documents such as bank checks. Checks having MICR data are printed in E-13B font.

In accordance with one aspect of the present invention, there is provided a character printing and recognition system including means for forming a toner image fixed to a sheet of support material with each character of the toner image being inverted so that the normally leading edge of each character is the trailing edge. Means are provided for magnetizing the toner image. Means move the sheet of support material with the leading edge of each character of the toner image fixed to the sheet of support material being the trailing edge. Means detect the intensity of the magnetic field generated by each character of the toner image fixed to the sheet so as to identify each character thereof.

Pursuant to another aspect of the present invention, there is provided a printing machine including a processor that forms a toner image fixed to a sheet of support material. Each character of the toner image is inverted. In this way, the normally leading edge of each character is the trailing edge.

Other aspects of the present invention will become apparent as the following description proceeds and upon reference to the drawings, in which.

While the present invention will be described hereinafter in conjunction with a preferred embodiment thereof, it will be understood that it is not intended to limit the invention to this embodiment. On the contrary, it is intended to cover all alternatives, modifications and equivalents as may be included within the spirit and scope of the invention as defined by the appended claims.

Figure 1:
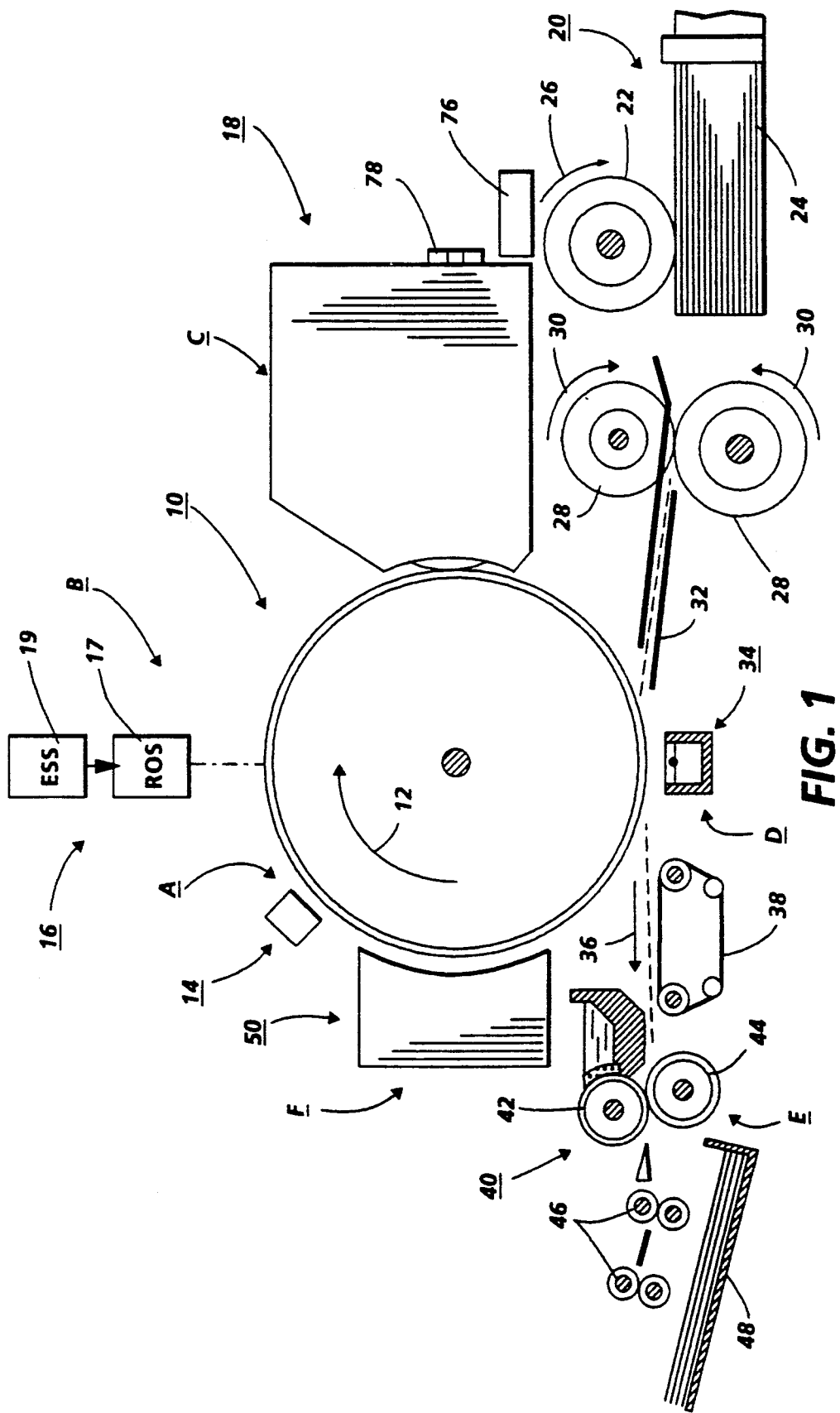
FIG. 1 is a schematic elevational view showing an illustrative electrophotographic printing machine incorporating the features of the present invention therein.

For a general understanding of the features of the present invention, reference is made to the drawings. In the drawings, like reference numerals have been used throughout to designate identical elements. FIG. 1 schematically depicts the various components of an illustrative electrophotographic printing machine incorporating the features of the present invention therein. It will become evident from the following discussion that the present invention is equally well suited for use in a wide variety of printing machines and is not necessarily limited in its application to the particular printing machine described herein.

Inasmuch as the art of electrophotographic printing is well known, the various processing stations employed in the FIG. 1 printing machine will be shown hereinafter schematically and their operation described briefly with reference thereto.

As shown in FIG. 1, the illustrative electrophotographic printing machine employs a drum 10 having a photoconductive surface adhering to a conductive substrate. Preferably, the photoconductive surface comprises a selenium alloy with the conductive substrate being an electrically grounded aluminum alloy. Drum 10 rotates in the direction of arrow 12 to advance successive portions of the photoconductive surface sequentially through the various processing stations disposed about the path of movement thereof.

Initially, a portion of the photoconductive surface passes through charging station A. At charging station A, a corona generating device, indicated generally by the reference numeral 14, charges the photoconductive surface to a relatively high, substantially uniform potential.

Figure 2:
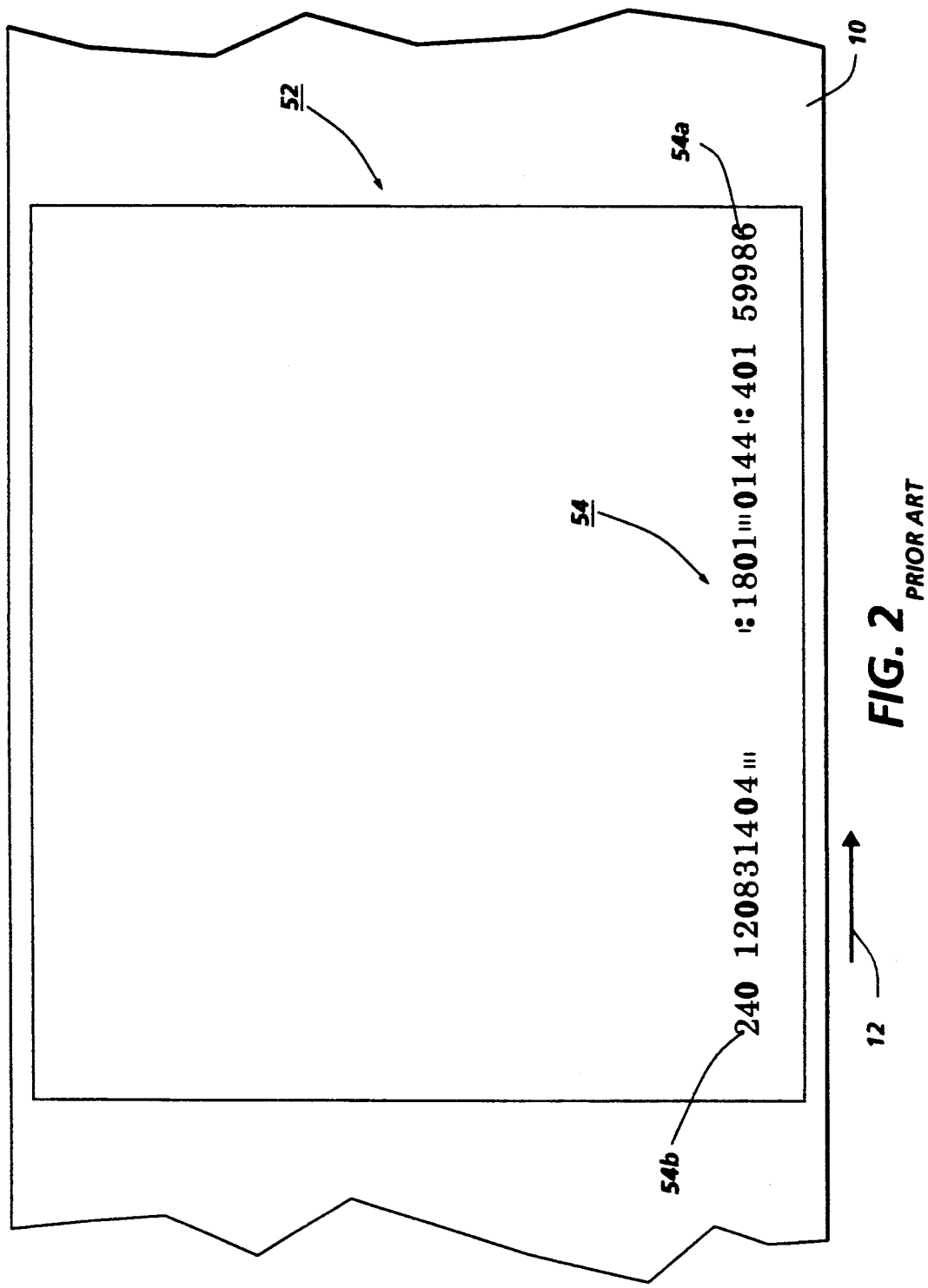
FIG. 2 is a fragmentary, plan view showing a latent image recorded on the photoconductive drum of the FIG. 1 printing machine with the characters in the normal orientation.
Figure 3:
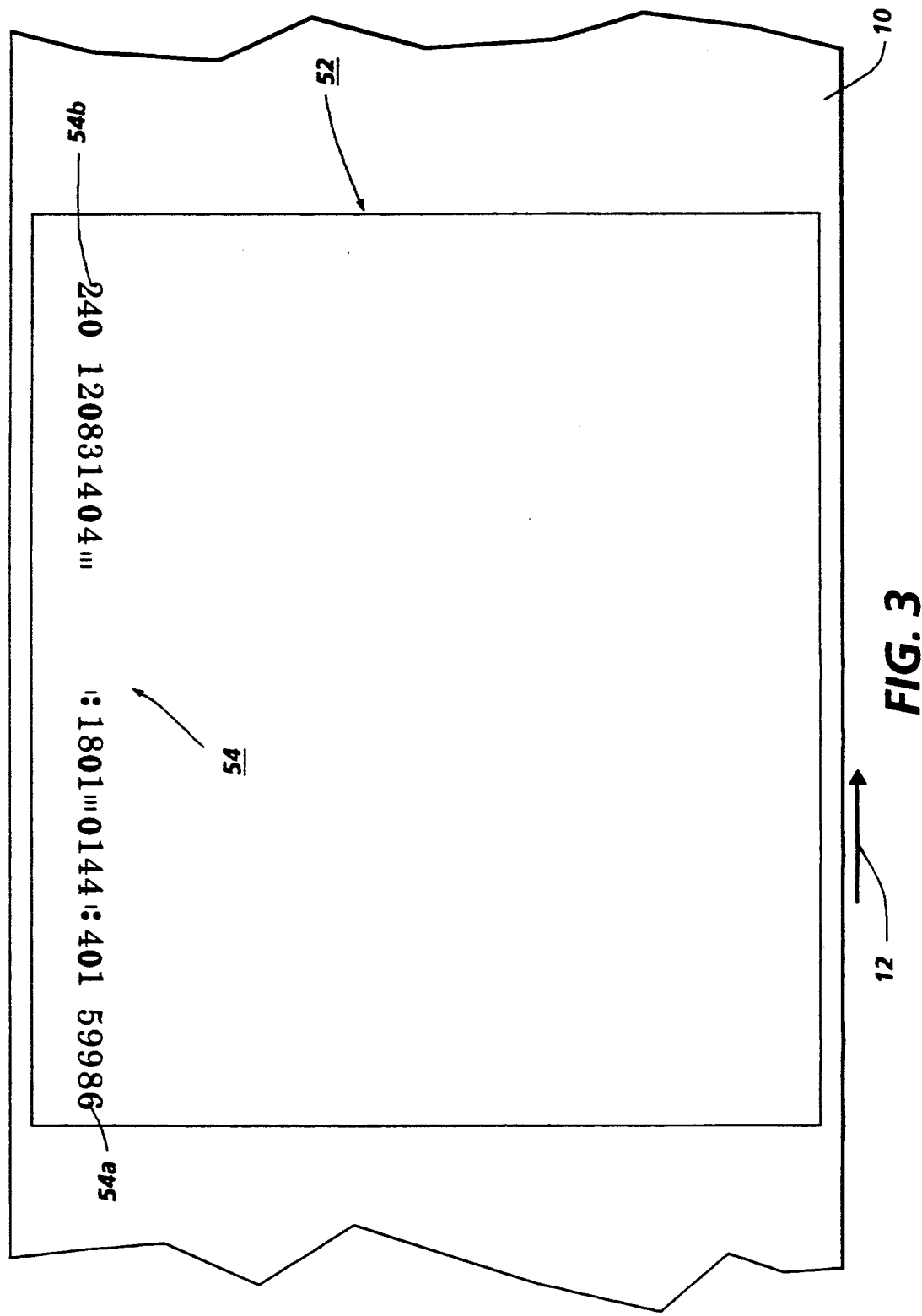
FIG. 3 is a fragmentary, plan view showing a latent image recorded on the photoconductive drum of the FIG. 1 printing machine with the characters inverted.

Next, the charged portion of the photoconductive surface is advanced through imaging station B. Imaging station B includes a raster scanning system, indicated generally by the reference numeral 16. The raster scanning system includes a raster output scanner (ROS) 17 and an electrical subsystem (ESS) 19. ESS 19 is the control electronics which prepare and manage the image data flow to the ROS 17. A series of raster scan lines, in electronic form, are transmitted to ESS 19. This corresponds to the information desired to be printed. The characters are transmitted to ESS 19 in their normal, non-inverted form. An electrostatic latent image recorded on photoconductive drum 10 of the normal, non-inverted characters is shown in FIG. 2. ESS 19 inverts the characters so that the leading edge of each character becomes the trailing edge thereof. An electrostatic latent image recorded on photoconductive drum 10 of the inverted characters is shown in FIG. 3. The signal corresponding to the inverted characters being printed is transmitted to ROS 17. ROS 17 lays out the inverted characters in a series of of horizontal scan lines with each line having a specified number of pixels per inch. The ROS includes a laser having a rotating polygon mirror block associated therewith. ROS 17 exposes the charged photoconductive drum to record thereon as an electrostatic latent image a series of inverted characters, as shown in FIG. 3. One skilled in the art will appreciate that in lieu of a laser, other suitable devices, such as light emitting diodes, may be used to irradiate the charged portion of the photoconductive drum so as to record a series of inverted characters thereon.

After the electrostatic latent image is recorded on the photoconductive drum 10, drum 10 advances the electrostatic latent image to development station C. At development station C, a magnetic brush developer unit, indicated generally by the reference numeral 18, transports a developer material of carrier granules having toner particles adhering triboelectrically thereto closely adjacent to, or into contact with the electrostatic latent image. The toner particles are magnetic and are preferably made from a ferromagnetic material, such as magnetite embedded in a resin binder. The latent image attracts toner particles forming a powder image of the inverted characters on the surface of photoconductive drum 10. Developer unit 18 uses a developer roller which is electrically biased to a potential intermediate that of the background potential and that of the image potential, i.e. the potential of the characters, recorded on photoconductive drum 10. In this way, a magnetic toner powder of the inverted characters is developed on photoconductive drum 10.

Drum 10 then advances the toner powder image to transfer station D. At transfer station D, a sheet of support material is moved into contact with the toner powder image. The sheet of support material is advanced to transfer station D by a sheet feeding apparatus, indicated generally by the reference numeral 20. Preferably, sheet feeding apparatus 20 includes a feed roll 22 contacting the uppermost sheet of a stack of sheets 24. Feed roll 22 rotates in the direction of arrow 26 to advance the uppermost sheet into a nip defined by forwarding rollers 28. Forwarding rollers 28 rotate in the direction of arrow 30 to advance the sheet into chute 32. Chute 32 directs the advancing sheet into contact with the surface of drum 10 in a timed sequence so that the toner powder image developed thereon contacts the advancing sheet at transfer station D.

Transfer station D includes a corona generating device 34 which sprays ions onto the backside of the sheet. This attracts the toner powder image from the surface of drum 10 to the sheet. After transfer, the sheet continues to move in the direction of arrow 36 on conveyor 38 to advance to fusing station E.

Fusing station E includes a fuser assembly, indicated generally by the reference numeral 40, which permanently affixes the transferred toner powder image to the sheet. Preferably, fuser assembly 40 includes a heated fuser roller 42 and a back-up roller 44. The sheet passes between fuser roller 42 and back-up roller 44 with the powder image contacting fuser roller 42. In this manner, the toner powder image is permanently affixed to the sheet. After fusing, forwarding rollers 46 advance the sheet to catch tray 48 for subsequent removal from the printing machine by the operator.

After the powder image is transferred from the surface of drum 10 to the sheet, drum 10 rotates through cleaning station F. At cleaning station F, a cleaning system, indicated generally by the reference numeral 50, removes the residual particles adhering to the surface of drum 10. In this way, the residual toner particles are removed from the surface of drum 10.

It is believed that the foregoing description is sufficient for purposes of the present invention to illustrate the general operation of an electrophotographic printing machine incorporating the features of the present invention therein.

Referring now to FIG. 2, exemplifies the prior art manner of recording an electrostatic latent image of character on the photoconductive surface of drum 10. Examples of magnetic ink characters which are used with an MICR are the CMC 7 character front and the E13B character font. The CMC 7 character font is employed as the standard character font in various countries in Europe. On the other hand, the E13B character font, as shown in FIG. 2, is used in both the United States and Japan. FIG. 2 shows an electrostatic latent image, indicated generally by the reference numeral 52, recorded on the photoconductive surface of drum 10 as it rotates in the direction of arrow 12 with the characters in their normal, non-inverted orientation. A series of non-inverted characters, indicated generally by the reference numeral 54, are recorded along the lower marginal region of latent image 52. Characters 54 are in the E13B character font. The leading character is designated by the reference numeral 54a with the trailing character being designated by the reference numeral 54b. The series of characters 54 are shown in the normal or non-inverted orientation. In this orientation, the leading edge of the character on the latent image corresponds to the leading edge of the character on the printed sheet. Under these circumstances, the MICR reader will read the leading edge of the character and the ragged edges of the leading edge may cause an incorrect determination of the character. These leading edge irregularities of each character can be dealt with by having them occur on the trailing edge. This is achieved by inverting the characters as shown in FIG. 3.

Turning now to FIG. 3, the latent image 52 is shown recorded on the photoconductive surface of drum with the series of characters 54 inverted so that the normally leading edge of each character is now the trailing edge. As depicted, the latent image of the characters 54 is rotated 180° and the series of characters reversed with each character being inverted. Character 54b now becomes the leading character of the series with character 54a being the trailing character of the series. Each character of the series is shown inverted so that the leading edge of each character is the trailing edge when compared to the normal orientation of the characters as shown in FIG. 2. The series of characters 54 are in reverse order and located in the upper marginal region of the latent image 52. Thus, the normal leading edge of each character is now the trailing edge thereof. The leading edge of the inverted characters will now have the ragged edges. When the printed sheet is read by the MICR reader, the sheet is inverted so that the trailing edge of each character is now the leading edge thereof. In this way, the ragged leading edge becomes the trailing edge when the characters are read by the MICR reader. This is shown in FIG. 4.

Figure 4:
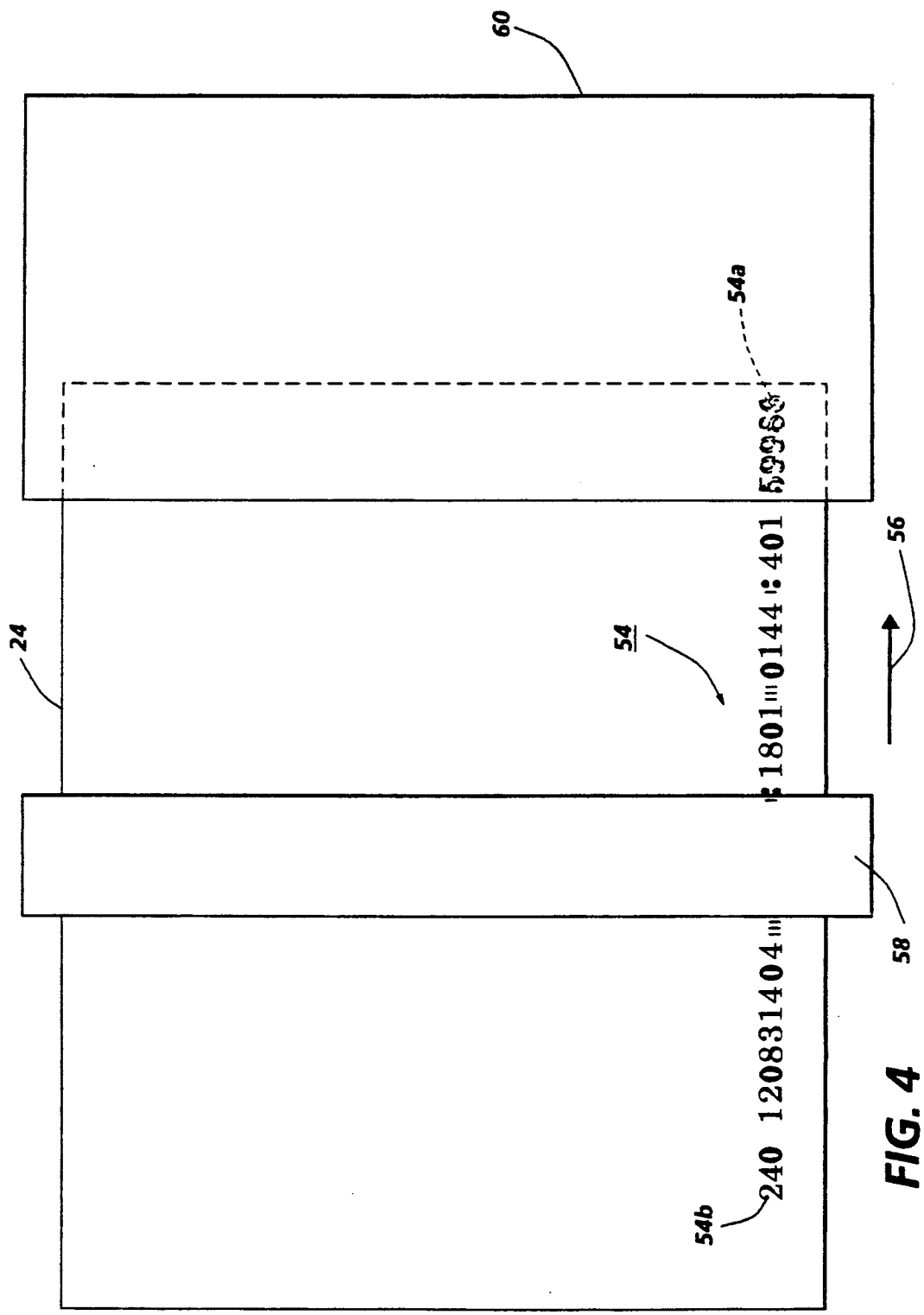
FIG. 4 is a plan view showing the sheet with the characters printed thereon in the FIG. 1 printing machine being advanced through a magnetizing unit and magnetic character reader.

FIG. 4 illustrates a sheet 24 having the series of characters printed 54 thereon. Sheet 24 is rotated 180° so that the series of characters are inverted with the trailing edge of each character formed during printing now being the leading edge thereof. As shown character 54a now is the leading character with character 54b being the trailing character. A conveyor advances the rotated sheet in the direction of arrow 56 through a magnetizing station having a pair of magnetizing heads 58. The magnetizing heads are substantially identical to one another with head being located adjacent one side of the sheet and the other head adjacent the other side of the sheet. Each magnetizing head includes a core around which is wound a coil connected by leads to a source of magnetizing current. Thus, as sheet 24 advances through magnetizing heads 58, the characters printed thereon become magnetized. The intensity of the magnetic flux is measured at the read station. The read station includes a MICR reader 60 which has a magnetic transducer. The magnetic transducer may be a single gap magnetic read head or other magnetic transducer known to those skilled in the art. The transducer of MICR reader 60 is energized by the magnetic field generated by each magnetized character of the series of characters 54 on sheet 24. The output signal from the transducer is transmitted to logic circuitry which processes the signal and compares it with a standard character font signal. A suitable character recognition system is described in U.S. Pat. No. 3,987,411 issued to Kruklitis et al. in 1976, the relevant portions thereof being hereby incorporated into this application.

In recapitulation, the printing machine of the present invention inverts the characters printed so that the normally leading edge is the trailing edge and the trailing edge is the leading edge. In this way, the normally trailing edge of each printed character has edge irregularities while the normally leading edge of each printed character has significantly reduced edge irregularities. The printed sheet is oriented in its normal orientation when passing through a magnetizing station and read station so that the lead edge passing therethrough is not ragged and edge irregularities now occur on the trailing edge. This results in improved character recognition.

It is, therefore, apparent that there has been provided, in accordance with the present invention, a character printing and recognition system that fully satisfies the aims and advantages hereinbefore set forth. While this invention has been described in conjunction with a preferred embodiment thereof, it is evident that many alternatives, modifications, and variations will be apparent to those skilled in the art. Accordingly, it is intended to embrace all such alternatives, modifications and variations that fall within the spirit and scope of the appended claims.

I claim:

1. A character printing and recognition system, including:
   means for forming a magnetizable toner image fixed to a sheet of support material with each character of the toner image being inverted so that the normally leading edge of each character is the trailing edge;
   means for moving the sheet of support material from said forming means along a path of travel, said moving means moving the sheet with the leading edge of each character of the toner image fixed to the sheet of support material being the trailing edge so that the normally leading edge of each character is the leading edge;
   means, disposed along the path of travel of the sheet, for magnetizing the toner image fixed to the sheet; and
   means, located after said magnetizing means along the path of travel of the sheet, for detecting the intensity of the magnetic field generated by each character of the toner image fixed to the sheet so as to identify each character thereof.

2. A system according to claim 1, wherein said forming means forms a toner image having a series of characters therein.

3. A system according to claim 1, wherein said forming means includes:
   a photoconductive member;
   means for recording an electrostatic latent image on the photoconductive member with the character recorded thereon being inverted so that the normally leading edge of each character in the latent image is the trailing edge;

means for developing the inverted character of the latent image recorded on the photoconductive member with magnetic toner to form a magnetic toner powder image on the photoconductive member;

means for transferring the toner powder image to a sheet of support material; and means for fusing the toner powder image to the sheet of support material.

4. A character printing and recognition system, including:

means for forming a magnetizable toner image fixed to a sheet of support material with each character of the toner image being inverted so that the normally leading edge of each character is the trailing edge, said forming means comprising of photoconductive member, means for recording an electrostatic latent image on the photoconductive member with the character recorded thereon being inverted so that the normally leading edge of each character in the latent image is the trailing edge, means for charging said photoconductive member to a substantially uniform potential, a raster output scanner for selectively discharging the charged portion of said photoconductive member to record the characters thereon, means for developing the inverted character of the latent image recorded on the photoconductive member with magnetic toner to form a magnetic toner powder image on the photoconductive member, means for transferring the toner powder image to a sheet of support material, and means for fusing the toner powder image to the sheet of support material;

means for moving the sheet of support material from said forming means along a path of travel, said moving means moving the sheet with the leading edge of each character of the toner image fixed to the sheet of support material being the trailing edge so that the normally leading edge of each character is the leading edge;

means, disposed along the path of travel of the sheet, for magnetizing the toner image fixed to the sheet; and means, located after said magnetizing means along the path of travel of the sheet, for detecting the intensity of the magnetic field generated by each character of the toner image fixed to the sheet so as to identify each character thereof.

5. A method of character printing and recognition, including the steps of:

forming a magnetizable toner image fixed to a sheet of support material with each character of the toner image being inverted so that the normally leading edge of each character is the trailing edge;

rotating the sheet so that the leading edge of each character of the toner image fixed to the sheet of support material is the trailing edge resulting in the normally leading edge of each character is the leading edge;

moving the sheet of support material from said forming means along a path of travel;

magnetizing the toner image fixed to the sheet as the sheet moves along the path of travel of the sheet; and detecting the intensity of the magnetic field generated by each character of the toner image as the sheet moves along the path of travel after said step of magnetizing so as to identify each character thereof.

* * * * *